3,826,730
DISPOSABLE ELECTROCHEMICAL ELECTRODE
Hideo Watanabe and John E Leonard, Fullerton, Calif., assignors to International Biophysics Corporation, Irvine, Calif.
Continuation of abandoned application Ser. No. 91,975, Nov. 23, 1970. This application Sept. 5, 1972, Ser. No. 286,199
Int. Cl. G01n 27/46
U.S. Cl. 204—195 P
3 Claims

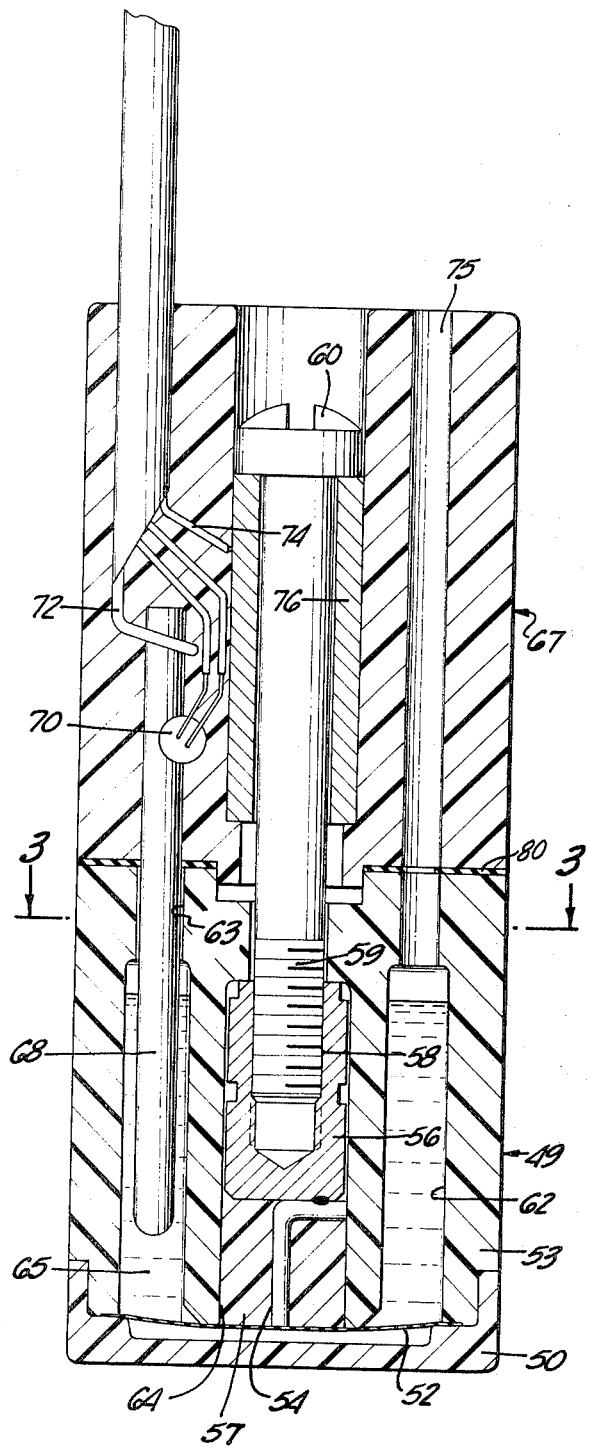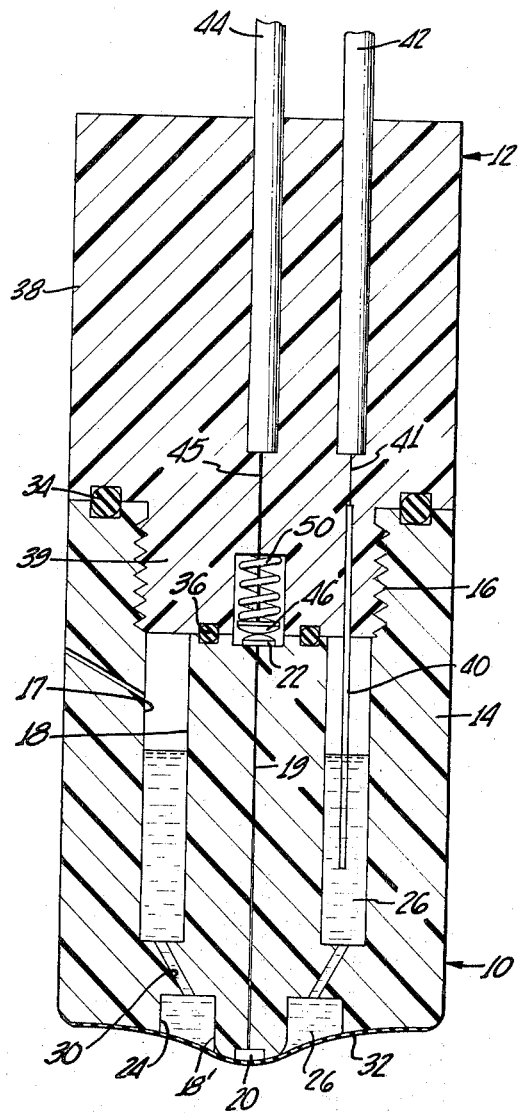
FIG. 1.
FIG. 2.
INVENTORS.
HIDEO WATANABE
JOHN E. LEONARD
BY FOWLER, KNOBBE
& MARTENS
ATTORNEYS United States Patent Office 3,826,730
Patented July 30, 1974

ABSTRACT OF THE DISCLOSURE

A disposable electrochemical cell electrode assembly for use in amperometric electrochemical cells. The disposable electrode assembly includes a selectively permeable membrane which is spaced a predetermined distance from the electrode. The disposable electrode assembly is threadedly attached to a permanent electrode assembly to complete the electrochemical cell.

RELATED APPLICATION

This is a continuation of application Ser. No. 91,975, filed Nov. 23, 1970, now abandoned.

This invention relates to an amperometric or polarographic electrochemical cell for measuring a constituent in a sample media. More specifically the electrochemical cell of this invention comprises a disposable electrode assembly which prolongs the useful lifetime of the major components of the cell.

It is well known that a cathode and anode in contact with an electrolyte can be selected so that when an appropriate electrical potential is applied one of the electrodes will be polarized. These electrochemical cells are typically designed so that the polarized electrode is in close proximity to a membrane which is selectively permeable to a gas constituent of a sample media. When the electrode is polarized essentially no current flows in the system. When the membrane is exposed to a media containing a gas constituent to be measured, the gas diffuses through the membrane and causes depolarization of the electrode in an amount proportional to the partial pressure of the gas. This enables a current flow in the electrochemical cell. The magnitude of the current flow is proportional to the partial pressure of the reactive gas and thus the current flowing in the cell becomes a function of the gas content. This type cell is fully disclosed in patent No. 2,913,386 to L. C. Clark. The Clark cell is typical of these devices in that the cathode is pressed against a plastic or rubber membrane which is selectively permeable to the gas. Typically these cells are used to sense hydrogen, oxygen or other gases.

Sensors of this type have been primarily in limited use for several years for measurement of oxygen in respiratory equipment or for the measurement of dissolved oxygen profiles in lakes or streams. More widespread use has been prevented by the effects on their performance of the membrane-electrode spatial relation during assembly and maintenance.

One chief drawback of this type electrochemical sensor is the difficulty in establishing and maintaining a stable close spacing between the surface of the sensor cathode and the inner surface of the selectively permeable membrane. The stability of this spacing determines the stability of the diffusion gradient of the gas through the membrane and electrolyte during sensor operation. The stability of this diffusion gradient directly determines the proportional signal level for the gas partial pressure. The thickness of the diffusion zone also determines the response time of the sensor. Thus a loose or poorly attached membrane causes slow and unstable response and the calibration of the sensor becomes extremely unreliable.

Although several attempts have been made to stabilize the membrane position, the prior art generally requires a fixed mechanical relationship between the anode and the cathode and requires that the gas permeable membrane be mounted as a separate member on the electrochemical sensor by some independent means either during the process of assembling the sensor or immediately prior to its use.

The problem of instability of the membrane-electrode relationship still exists since the mounting of the membrane in a correct manner to obtain optimum sensor performance characteristics is an operation which requires a considerable degree of dexterity and experience. It cannot often be successfully and reliably performed by the user of the sensor. Thus reliable measurements have only been obtainable generally with users who have developed the patience and skill required to successfully install the membranes.

Additionally, the operative life of these present electrochemical sensors is limited by the life of the polarized and depolarized electrode adjacent the selectively permeable membrane. Typically this electrode may be a gold cathode and its surface area and spacing from the membrane are critical in determining the calibration of the sensor. For example, as the effective surface area of the cathode is increased by contamination during reaction, the sensor calibration becomes very unreliable and the entire sensor must eventually be replaced. These factors have all contributed to the limitation on the use of such electrochemical sensors at this time.

The electrochemical sensor of this invention comprises a permanent electrode assembly and a replaceable or disposable electrode assembly which can be easily attached together to form an electrochemical cell. The disposable assembly includes a selectively permeable membrane and an electrolyte well. The selectively permeable membrane is fixedly connected to the housing of the replaceable electrode assembly.

The replaceable electrode housing has an electrolyte well and passage therein so that the electrolyte communicates with both the electrode and the membrane. The permanent electrode assembly is removably attached to the replaceable electrode assembly so that the permanent electrode extends into contact with the electrolyte to complete the cell.

The replaceable electrode section of the cell may be mounted to the permanent electrode section of the cell by any appropriate fastener means such as threads, screws, clamps, etc. A gasket may be provided between the two sections and they may be drawn together by means of a threaded screw which extends into an electrically conductive socket in the replaceable electrode assembly and passes through an electrically conductive sleeve in the permanent electrode. Any means of joining the two electrode portions in a fluid-tight manner which provides electrically conductive access to the replaceable electrode may be used. Economically it is best to extend the anode and cathode cables from the permanent electrode assembly and provide appropriate contacts from the replaceable assembly. In this fashion neither the cables nor the terminals to which they are connected need to be disturbed when the replaceable electrode is changed.

The electrode in close proximity to the membrane may be a noble metal such as silver or gold and the other electrode may be another metal of appropriate electronegativity to form a cell in combination with the first electrode. For example, this electrode may be zinc, cadmium, lead, platinum or a different noble metal or a silver-silver chloride anode or other such electrode material. The electrolyte may be a saline electrolyte or a potassium chloride solution, potassium hydroxide solution or other such electrolyte solutions. The membrane may be polytetrafluoroethylene, a polyolefin, a silastic, rubber, vinyl chloride and the like. A temperature compensating thermistor may be provided on the cell to stabilize its operation over a wide temperature range.

The replaceable electrode assembly can be preassembled with the electrode and the membrane accurately spaced so that the user does not require expertise in positioning the membrane. All that is required is that the replaceable electrode unit be attached to the permanent unit. Since electrode size and spacing are known for the cell and since the replaceable electrode may have the electrolyte added and is all preassembled, it can be pre-calibrated and the calibration marked thereon prior to sale.

One feature of the invention described herein is that the electrochemical cell can be easily assembled and calibrated reliably.

Another feature of this invention is that damage to the membrane or the electrode in close proximity to the membrane can be corrected by replacing the disposable electrode assembly and does not require replacement of the entire cell.

Another feature of the electrochemical sensor of this invention is that the permanent electrode is not damaged by replacement of the replaceable electrode.

Still another feature of the electrochemical sensor of this invention is that the selectively permeable membranes can be accurately mounted in spaced relationshp with the electrode prior to sale and without requirement for the user to attach the membrane immediately prior to use.

These and other features of the device of this invention will become more apparent when the following description is taken in conjunction with the appended claims and the following drawings wherein:

FIG. 1 is a longitudinal vertical cross section of an electrochemical sensor constructed in accordance with this invention;

FIG. 2 is a longitudinal vertical sectional view of another embodiment of an electrochemical sensor constructed in accordance with this invention;

Figure 4:
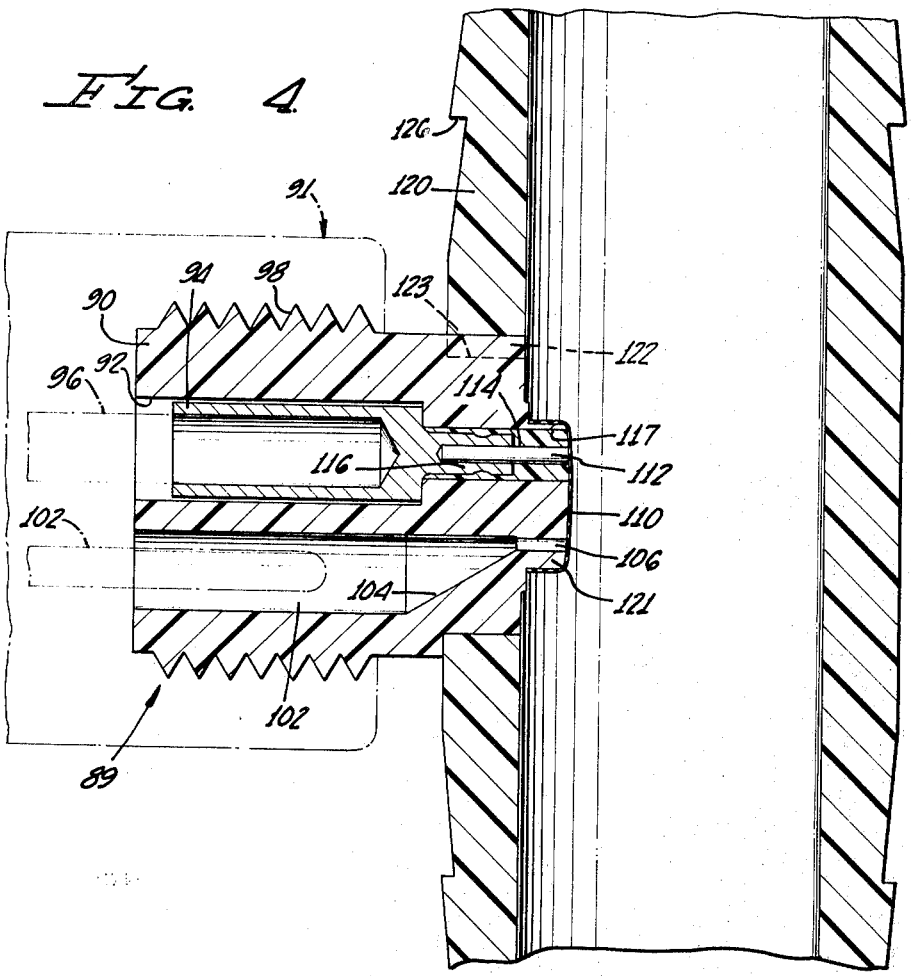
FIG. 4 is a sectional view through a replaceable electrode section of another embodiment of the device of this invention.

Referring now to FIG. 1, it will be seen that the electrochemical sensor cell of this invention comprises a replaceable or disposable electrode assembly or unit 10 and a permanent electrode assembly or unit 12. The disposable electrode unit 10 is enclosed in a generally cylindrical, electrically non-conductive body or housing 14 which has an internally threaded bore 16 extending partially therein. An annular electrolyte well 17 extends from the threaded bore 16 to the lower end of the housing 14 defining an upstanding central cylindrical post 18. A smaller diameter portion 18' of the post 18 extends below the bottom of the well 17. A conductor, such as the wire 19, extends from an electrode button 20 at the lower end of the small diameter portion 18' of the post 18 to a contact 22 at the upper end of the post 18. The electrode 20 is in communication with an electrolyte chamber 24 which is shown containing an electrolyte fluid 26. For example, with the electrode 20 a cathode, the electrolyte 26 may be a conventional saline electrolyte material.

The electrolyte chamber 24 of the disposable unit 10 is supplied with electrolyte by the annular well 17 which communicates with the chamber 24 through the channels 30 extending from the bottom of the well 17 into the electrolyte chamber 24. It has been found that two such channels 30 are sufficient to maintain the chamber 24 filled with the electrolyte; more or less could be used, however.

A selectively permeable membrane 32 is bonded in a fluid tight manner to the lower end of the housing 14. The membrane is fully permeable only to the material to be analyzed and substantially impermeable to the electrolyte. For example, the membrane may be polyethylene or polytetrafluoroethylene. In a polarographic cell for measurement of oxygen the membrane is substantially impermeable to materials other than gases so that the electrolyte 26 is retained in the electrolyte chamber by the membrane 32. The membrane 32 may be bonded to the housing 14 by any conventional manner such as by the use of expoxies or solvent bonding materials such as methylene chloride or it may be held in place by a pressure fitting. The membrane 32 engages the lower surface of the post 18' and the cathode 20. Preferably the lower surface of post 18' and the cathode 20 are roughly ground, e.g., with a 600 grit paper to permit permeation of the electrolyte intermediate the cathode and the membrane.

A fluid-tight seal is provided between the disposable unit 10 and the permanent unit 12 by the use of a pair of O-rings 34 and 36 which are drawn into fluid tight contact with both the disposable unit 10 and the permanent unit 12 when the disposable electrode housing 14 is threadedly advanced onto the unit 12.

The permanent electrode unit 12 of the electrochemical cell comprises a generally cylindrical electrically non-conductive body or housing 38 which has a depending subjacent threaded lower core 39. The body 38 has an electrode 40 mounted therein and extending therefrom. The electrode 40 is electrically connected to a conductor 41 which also is conductively attached to a first cable 42. A second cable 44 is molded into the body 38 so that it electrically contacts a conductor such as the wire 45. The cables 42 and 44 may be connected to appropriate electrical terminals (not shown).

A contact member 46 is attached to the lower end of the conductor 45 and may be biased as by the helical coil spring 50 into contact with the contact 22 to assure good electrical connection between the electrode 20 and the cable 44 when the threaded core 39 is fully advanced into the threaded bore 16. Additionally the electrode 40 extends into the electrolyte 26 in the well 17, without contacting the sides of the well 17, to complete the electrochemical cell when the units 10 and 12 are threadedly connected. By proper dimensioning of the well 17 and the electrode 40, abrading friction on the electrode can be easily avoided during connection of the two electrode assemblies and during operation of the electrochemical cell.

The disposable electrode unit 10 can readily be replaced if the electrode 20 becomes contaminated or the membrane 32 is damaged. The electrode 40 is much longer lasting and can be retained and used with another disposable electrode assembly 10. For a polarographic electrochemical cell, in the preferred embodiment, the electrode 40 is typically a silver anode and the electrode 20 is a gold button cathode. Any metals of the appropriate relative electronegativity may be used, however.

The electrode units 10 and 12 may be molded from non-conductive plastic such as a polycarbonate, e.g. Lexan or an ABS polymer.

Referring now to FIG. 2, another embodiment of the invention will be discussed with respect to its preferred construction for the polarographic measurement of oxygen. In this embodiment a cathode assembly 49 is provided with a lower press fit cap 50 for retaining a selectively permeable membrane 52 in position adjacent a gold wire cathode 54. The cap 50 may, in addition to its press fitting, be bonded to the housing 53 of the cathode section 49. The gold wire cathode 54 is subjacent and contiguous with an electrically conductive receptacle 56. For example the gold wire 54 may be spot welded to the receptacle 56 and potted in place with an epoxy 57. The receptacle 56 is provided with an inner bore which is threaded at 58 for receiving the threaded portion 59 of an elongate screw 60, as shown in FIG. 2.

In this embodiment an annular well 62 surrounds a cylindrical post 64 so that the electrolyte 65 can contact the membrane 52 and permeate between the membrane 52 and the bottom of the post 64 to contact the cathode 54. The cathode 54 is potted in the post 64 so that its lower end is flush with the lower surface of the post 64. Th anode assembly 67 includes an anode 68 which extends through a bore 63 into the well 62 for completing the electrochemical cell. A temperature compensating device such as the thermistor 70 may be incorporated in the anode assembly 67 of the cell for compensating for temperature variation. Appropriate electrical cables such as the cable 72 which contacts the anode and the cable 74 which contacts the screw 60 through an electrically conductive sleeve 76 are provided for attaching the cell to appropriate instrumentation such as an oxygen analyzer.

During assembly of the electrochemical sensor shown in FIG. 2, the elongate screw 60 is threaded into contact with the threaded bore 58 in the electrically conductive member 56 to provide a good electrical contact between the screw and the cathode 54. A resilient gasket 80 may be provided intermediate housings of the anode assembly 67 and the cathode assembly 49 for forming a fluid-tight seal between these two housings of the sensor when the screw 60 is tightened.

Figure 3:
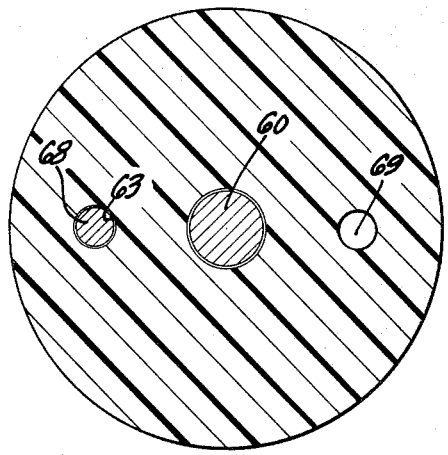
FIG. 3 is a transverse horizontal sectional view of the device of FIG. 2 taken substantially along line 3—3.

As best shown in FIG. 3, the cathode assembly 49 includes another orifice 69 for communication with the well 62 in addition to the orifice 63. The orifice 69 extends upwardly and is concentric with an orifice 75 on the anode housing so that electrolyte can be added to the cell after the anode and cathode have been connected. The orifice 63 receives the anode when the two electrode assemblies are tightly connected by the screw 60.

Referring now to FIG. 4, another embodiment of the disposable electrochemical sensor of this invention will be discussed again with respect to its construction for use in polarographically determining the oxygen content in a media. FIG. 4 shows a cathode assembly 89 having a generally cylindrical housing 90. The anode assembly 91 is shown in phantom lines. The cathode assembly housing 90 is provided with an off-center bore 92 for receiving an electrically conductive receptacle sleeve 94. The sleeve 94 is adapted to receive an electrically conductive plug such as the plug 96 attached to the anode assembly 91 in phantom lines. The plug 96 frictionally engages the receptacle sleeve 94 and can be used in the place of the screw 60 discussed with respect to FIG. 2. The cathode assembly housing 90 may also be provided with external threads 98 for threadily advancing the cathode assembly 89 into a mating bore on the anode assembly 91 in reverse fashion to the electrochemical sensor discussed with respect to FIG. 1. Appropriate O-rings or other resilient seals may be provided between the cathode and anode portions as discussed with respect to FIG. 1.

The cathode assembly 89, as shown in FIG. 4, is provided with a generally cylindrical well 102 in the housing 90 which tapers near the lower end thereof in a tapered portion 104 and which communicates with one end of a cylindrical orifice 106, the other end of which is in communication with a selectively permeable membrane 110. The membrane 110 also is maintained in a fixed relation against a cathode wire 112. The other end of the wire 112 electrically contacts an electrically conductive receptacle 116 which is conductively connected to the receptacle 94 as shown. For example, the cathode wire may be a gold wire of 0.025 inch diameter which is inserted into a copper or brass tube 116 which is crimped. Both the tube 116 and the cathode are then surrounded with an epoxy 117 or other bonding material for fixing them in place. The membrane 110 is bonded to the cathode housing 90 and is further held in place by means of a flow-through tube 120 which is also bonded to the cathode housing 90. When electrolyte is added through the well 102 it descends into the orifice 106 and permeates between the cathode wire 112 and the membrane 110. The lower surface of the cathode wire 112 and the epoxy potting material 117 are roughly ground to permit such electrolyte permeation into the flow path between the membrane and the cathode.

The flow-through tube 120 is generally fitted with a circular orifice for receiving the lower end 121 of the cathode assembly housing 90. The tube 120 may be provided with a key 122 which fits into an axially extending keyway 123 on the cathode assembly housing 90. This assures that all cathodes that are mounted on the flow-through tubes 120 will be oriented in the same manner.

The tube 120 may also be tapered at its ends as shown at 126 for mounting within a hose so that the fluid can be channeled through the orifice of the flow-through tube 120. The flow-through tube 120 in this manner protects the membrane from inadvertent contact with material which might damage the membrane during storage or handling. The media for which a constituent is to be sensed is caused to flow through the tube 120 and into contact with the membrane 110 so that accurate measurements of the constituent can be obtained.

The cathode assembly 89, as shown in FIG. 4, has additional advantages in that with the use of an eccentrically mounted gold cathode and a single electrolyte well, it is possible to miniaturize the cathode for measurements of small quantities of sample and for adaptation to instrumentation of various sizes.

The flow-through embodiment shown in FIG. 4 may be adapted for measuring either a liquid or gaseous media by deviating a central stream through the flow-through attachment. This embodiment protects the membrane without requiring special caps or other protective devices.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An improvement in electrochemical cells of the type which comprise an electrolyte chamber, a first electrode in communication with electrolyte in the chamber, a second electrode, and a selectively permeable membrane which is in contact with the second electrode and in communication with electrolyte in the chamber, the improvement wherein the membrane is in fixed relation to the second electrode, and the second electrode, chamber and membrane are in a replaceable and disposable electrode assembly to permit a new electrode assembly to be substituted for a damaged or different disposable electrode assembly without alteration or disassembly of a reusable electrode assembly, the improved construction comprising:
   a reusable electrode assembly adapted to being repeatedly reused in connection with a disposable electrode assembly, the first electrode being supported in the reusable electrode assembly;
   a disposable electrode assembly adapted to being used in connection with the reusable electrode assembly and to being removed from such connection and disposed of without disassembly of the reusable electrode assembly, the second electrode assembly comprising; means defining the electrolyte chamber to contain electrolyte and to receive the first electrode in contact with such electrolyte, means supporting the second electrode independently of the first electrode, and means supporting the membrane in predetermined relation to the second electrode and permitting communication between the membrane and electrolyte in the chamber and for contact with a sample media for determining a constituent of said media;

the first electrode being so constructed and positioned as to extend into contact with electrolyte when the two electrode assemblies are connected and electrolyte is in the chamber.

2. An electrochemical cell which comprises a reusable electrode assembly, a disposable electrode assembly, and means for connecting the two assemblies together for use as a single cell and for disconnecting the two assemblies from each other without disassembly thereof:

the reusable electrode assembly comprising a first electrode constructed and adapted to extend into an electrolyte chamber in the second electrode assembly; a first conductor for permitting electrical communication between the first electrode and a first electrical terminal remote from the cell; and a second conductor which includes an electrical contact for permitting electrical communication between the contact and a second electrical terminal remote from the cell;

the disposable electrode assembly comprising means defining an electrolyte chamber so constructed and disposed as to receive the first electrode and to permit removal of the first electrode therefrom without alteration of the first electrode or disassembly of the reusable electrode assembly; a second electrode; a contact electrically connected with the second electrode so constructed and positioned in the disposable electrode assembly as to make electrical contact with the second electrical conductor in the reusable electrode assembly when the two assemblies are connected to thereby permit electrical communication between the second electrode and the second remote electrical terminal; and a selectively permeable membrane disposed in fixed relation to the second electrode for communication with electrolyte in the chamber and for contact with a media having a constituent to be determined by the cell;

said assemblies and said means for connecting said assemblies being so constructed as to permit said assemblies to be connected together and disconnected from each other without disassembly of either of said assemblies.

3. A polarographic cell in which the cathode and the selectively permeable membrane are in predetermined relation in a disposable assembly and the anode is in a reusable assembly to thereby permit assembly of the cell without disturbing the relationship between the cathode and the membrane, comprising:

a reusable assembly which includes first and second conductors for collecting the cell to analyzer-instrumentation; an anode electrically connected to the first conductor; and a contact electrically connected to the second conductor;

a disposable assembly which includes means defining an electrolyte chamber, the chamber and the anode being so constructed and disposed relative to each other that the anode is inserted into the chamber for contact with electrolyte therein when the assemblies are connected to form the polarographic cell and the anode is removed from the chamber when the assemblies are disconnected from each other, without disassembly of either the reusable assembly or the disposable assembly; a cathode; a contact connected to the cathode so positioned in the disposable assembly as to cause electrical connection between the cathode and the second conductor in the reusable electrode when the cell is assembled; a selectively permeable membrane; and means disposing the membrane in predetermined relation to the cathode, for communication with electrolyte in the chamber, and for contact with media having a constituent to be analyzed; and means permitting connection and disconnection of said assemblies to assemble and disassemble said polarographic cell without disassembly of either the disposable assembly or the reusable assembly.

References Cited

UNITED STATES PATENTS

| | | | |
|---|---|---|---|
| 3,351,544 | 11/1967 | Medlar | 204—195 P |
| 2,913,386 | 11/1959 | Clark | 204—195 P |
| 3,676,220 | 7/1972 | Ward | 204—195 P X |
| 3,476,672 | 11/1969 | Snyder et al. | 204—195 G |
| 3,510,421 | 5/1970 | Gealt | 204—195 P |
| 3,518,179 | 6/1970 | Bleak et al. | 204—195 P |

GERALD L. KAPLAN, Primary Examiner